Jan. 24, 1967   O. JUNKER   3,300,565
VACUUM INDUCTION FURNACE
Filed June 15, 1964   3 Sheets-Sheet 1

Jan. 24, 1967  O. JUNKER  3,300,565
VACUUM INDUCTION FURNACE
Filed June 15, 1964  3 Sheets-Sheet 2

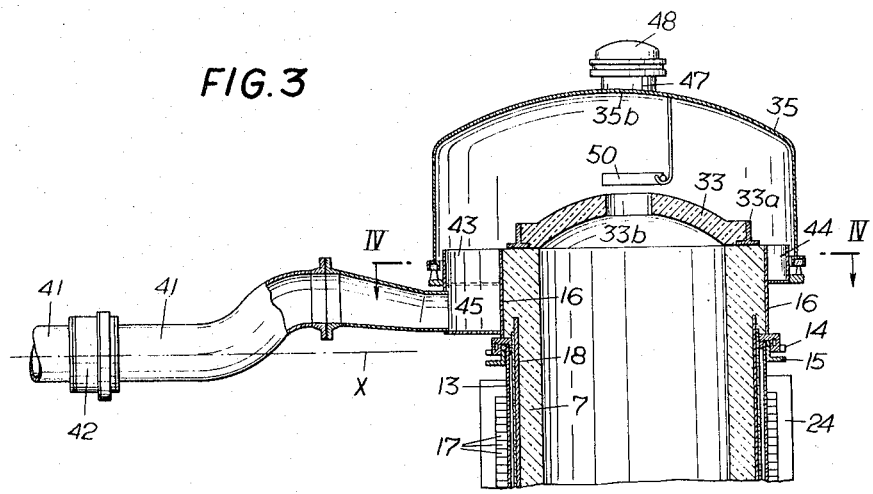
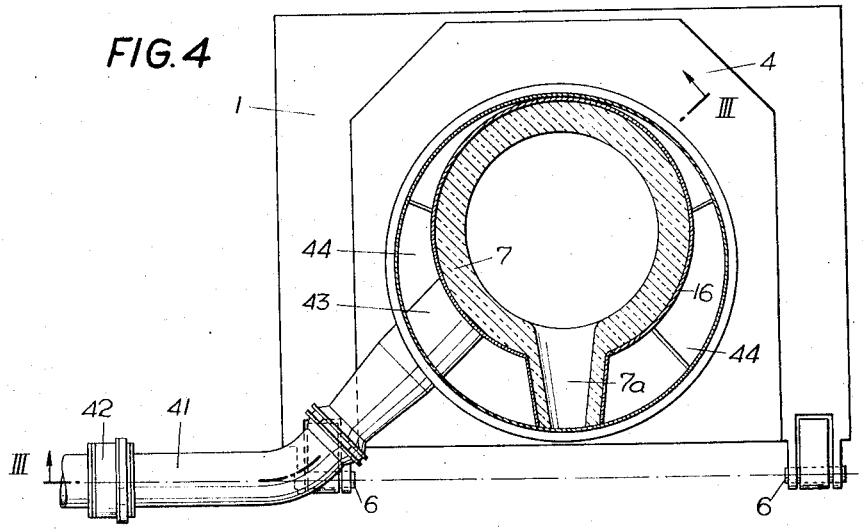

3,300,565
VACUUM INDUCTION FURNACE
Otto Junker, Lammersdorf uber Aachen, Germany
Filed June 15, 1964, Ser. No. 375,166
Claims priority, application Germany, June 20, 1963,
J 23,903
10 Claims. (Cl. 13—27)

The invention relates to vacuum induction furnaces, and relates more particularly to coreless induction vacuum furnaces for large capacity charges, for either melting or holding under rarefied air.

Reference is had to my Patent No. 3,056,847, dated October 2, 1962.

To melt, or to hold, metal under rarefied atmospheric conditions has many advantages, among which there is the removal of gaseous substances from the surface of the metal bath.

The invention relates to melting furnaces, as well as to holding furnaces, and wherever herein below one of these types is mentioned, it will be understood that this mentioning also is meant to include the other type.

For the large scale vacuum melting of steel, the use of coreless induction furnaces, especially of line frequency induction furnaces, also known as network frequency induction furnaces, of a network frequency of, for instance, about from 50–60 cycles, is particularly attractive:

These furnaces may be installed into the steel melting process before the pouring of the steel into molds; these line frequency induction furnaces may connect with their induction coil directly to the existing network; the large, though controllable, bath movement that is characteristic of coreless induction furnaces offers the advantage that the de-gasing of the steel melt is intensified and accelerated, as the gases are constantly moved from the interior of the metal bath to the surface, where they are removed by the prevailing vacuum.

Some of the difficulties in using large capacity electric induction vacuum furnaces prior to the advent of my aforesaid Patent No. 3,056,847 are recited in that patent. Patent No. 3,056,847 relates to a coreless induction vacuum furnace for large capacity charges. The furnace includes an upper part and a lower part, a crucible that extends between these parts and holds the molten metal bath, a primary induction coil, and vacuum sealing means. The vacuum sealing means include a gastight sleeve between the coil and the crucible and upper and lower closures which define with the sealing means a vacuum chamber. Cooling means for the sleeve are provided which are disposed adjacent the inner surface of the sleeve.

The connection to the source of rarefied air is disposed near the upper closure.

Reference is had to my three co-pending applications Ser. Nos. 375,163; 375,164; and 375,165, filed concurrently herewith.

As previously stated, the molten metal bath during the induction heating is subject to strong bath movement. Constructions of this type require the provision of a long space within the vacuum chamber between the level of the molten bath and the end of the vacuum suction line above the bath. From the point of view of melting technique, this considerably large minimal distance between the bath level and the end of the suction line is not only unnecessary but even detrimental; for reasons pointed out below, however, the provision of this considerably large minimal distance has been found necessary in these constructions in the past.

Briefly stated, this large minimal distance between the metal bath level and the end of the vacuum suction line, which leads to high vacuum induction furnace constructions, was considered necessary to remove the vacuum sealing means, such as gaskets or the like, from the danger zone of any injurious direct hits from any spray metal hurled from the metal bath.

During the induction heating, metal spray is thrown by the moving bath towards the upper portions of the inner side walls of the crucible and particularly against the underside of the furnace cover. Owing to the aforesaid large spacing, the heat radiated from the bath against the underside of the cover is relatively small and the temperature of that underside relatively low. The temperature is sufficiently low, so that the spray metal deposits on the underside of the cover solidify and build up into continuous deposits which gradually lead to clogging of the passage that lies in advance of the suction line.

These sprays lead not only to disturbances of the furnace operation, requiring costly and time consuming removal of the deposits from the underside of the cover, but also cause metal build-ups at the areas between the border of the cover and the crucible, making it difficult to open the cover without injury to either the cover or the crucible.

At first thought, the simplest remedy might be to shorten the height of the crucible, so as to increase thereby the heat radiation from the metal bath to prevent the solidification of the metal sprays. This reduction in height, however, is not possible because of the danger that the metal spray may reach and injure, or even destroy, the sensitive sealing devices, such as gaskets or the like, which would bring about a prohibitive lessening of the prevailing vacuum.

It is accordingly among the principal objects of the invention to provide a vacuum induction furnace of a low height, the extent of which is determined solely by melting technique requirements.

It is another object of the invention to provide such a furnace that has at least two upper closures for the vacuum chamber, namely at least one inner cover within the vacuum chamber closing the crucible, and at least one outer lid closing the vacuum chamber.

It is a further object of the invention to provide such a furnace wherein the cover for the crucible is sufficiently close to the level of the metal bath, that the heat radiated from the metal bath will prevent solidification of metal sprays on the underside of that cover.

It is still another object of the invention to provide such a furnace wherein the outer lid surmounts the vacuum chamber comprising a crucible and the aforesaid inner cover and including the spout and carries out the sealing by means of a sealing device arranged externally of the crucible and below the upper rim of the crucible.

It is still a further object of the invention to provide a suction line for such a furnace which is rotatable about the tilting axis of the furnace, and which terminates in an upward direction in the vacuum chamber, the point of termination being separated from the metal bath by the inner cover.

It is yet another object of the invention to provide such an inner cover which is composed of refractory material but is not gas impermeable, while the outer lid is composed of gas impermeable material.

It is yet another object of the invention to provide a sealing device for the outer cover, which includes an axially projecting wedge-shaped sealing ridge formed externally on the crucible, and an inverted groove formed on the outer lid and filled with a deformable sealing mass that gas impermeably rests on the ridge.

It is yet a further object of the invention to provide a conduit for a cooling fluid adjacent said groove and/or said ridge, for improved sealing.

It is yet a further object of the invention to provide the cover as well as the lid with registering closable openings, for the removal of the specimens and the adding of alloying ingredients; the opening of the outer lid is gastightly sealable from the exterior, while the opening or aperture of the inner cover may be closed by a movable flap.

The foregoing and other objects of the invention will be best understood from the following description of an exemplification thereof, reference being had to the accompanying drawings, wherein:

FIG. 3 is a fragmentary vertical sectional view taken on the line III—III of FIG. 4; and FIG. 4 is a fragmentary schematic horizontal sectional view, taken on the line IV—IV of FIG. 3.

Figure 1:
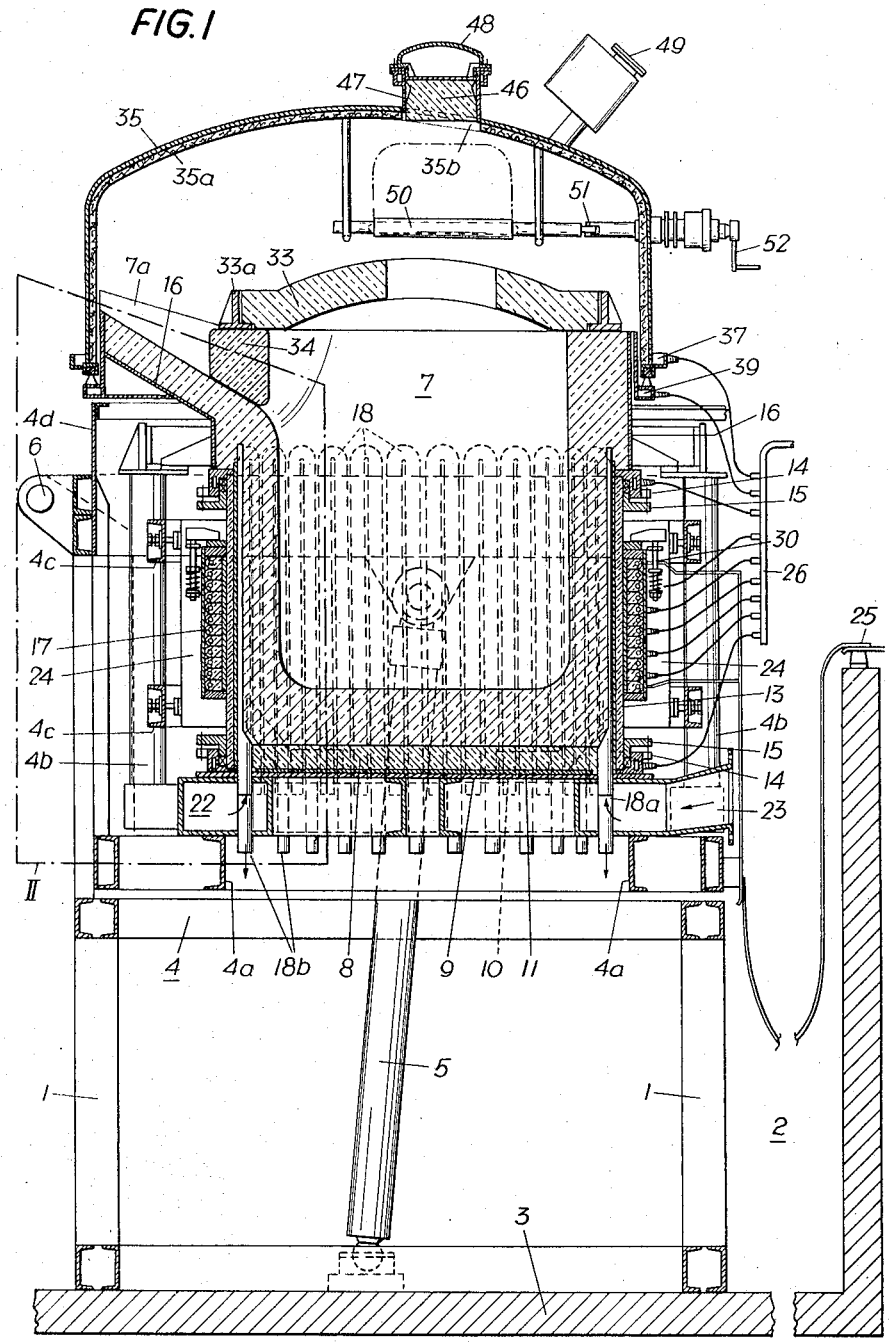
FIG. 1 is a fragmentary vertical sectional view of a vacuum induction furnace in accordance with the invention.
Figure 2:
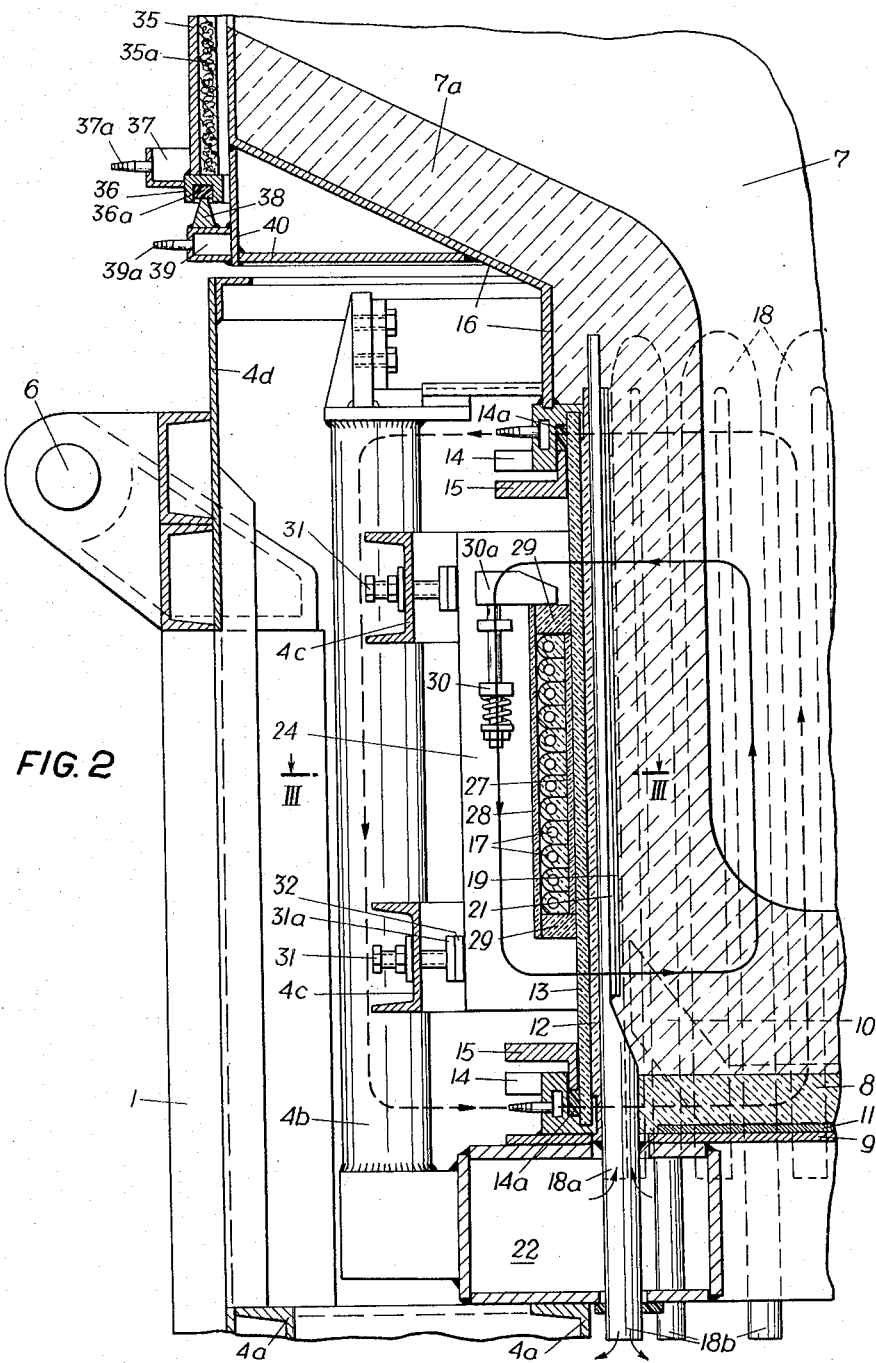
FIG. 2 is a fragmentary large scale vertical sectional view of a detail framed at II in FIG. 1.

In carrying the invention into effect in one of the embodiments which has been selected for illustration in the accompanying drawings and for description in this specification, and referring now particularly to FIGS. 1 and 2, there is provided an electric vacuum induction furnace which is supported on a framework 1. The framework 1 rests on a foundation 3 in a depression 2. A frame 4 is provided that is tiltable about hinges 6, and surrounds and is connected to and supports the furnace housing which, in turn, surrounds the crucible 7; the housing, on the other hand, is surrounded by and supports the coil and its reinforcements. Furnace tilting means are provided which include a hydraulic cylinder 5 that is supported by the foundation 3 and can be actuated to tilt the frame 4 and therewith the furnace housing including the crucible 7 and the coil 17 about the substantially horizontal axis X of the hinges 6.

As best shown in FIG. 4, the crucible 7 is provided with a spout 7a, the vertical central axial plane of which intersects at right angle the aforesaid axis X of the hinges 6.

The frame 4 comprises a bottom structure that is composed of interconnected elongated steel beams and a series of six columns 4b which are arranged evenly distributed around a circle, furthermore of channel irons 4c that interconnect the columns 4b to each other, and lastly an outer structure 4d. The frame 4 also comprises beams 4a that support the bottom of the crucible 7. The columns 4b serve to anchor the upper part, a steel mantle 16, of the housing for the crucible 7 to the lower part of that housing, as the furnace including its housing comprises an upper part and a lower part which are gastightly sealed on the exterior.

The bottom of the crucible 7 rests on a layer of refractory bricks 8 which, in turn, are supported by a plate 9 that covers the beams 4a. The plate 9 is made of non-ferritic metal and forms the lowermost closure of the vacuum chamber of the furnace.

In order to restrain losses by the occurrence of a stray field (shown in broken lines in FIG. 2, the direction of the stray currents being indicated by arrows) near the bottom of the crucible 7, and to impart instead to the stray field a desired extent and shape (shown in FIG. 2 in solid lines passing through the spring bolts 30), there are provided near the bottom additional magnetic yokes 10 composed of laminated heat insulated transformer steel sheets.

In order to shield still further the plate 9 against the stray field of the coil 17, there is provided a layer 11 that is composed of a material having high electric conductivity characteristics. The layer 11 is disposed below the yokes 10 and below the bricks 8.

Vacuum sealing means are provided which comprise a cylindrical sleeve 13 that is composed of gas impermeable material having low electric and magnetic conductivity characteristics, such as synthetic plastic, plastic impregnated paper, or the like. The lower edge of the sleeve 13, as best shown in FIG. 2, is inserted into an annular groove that is formed by an annular flange 14 that is welded to the plate 9 and projects upwardly therefrom. The flange 14 may be hollow to provide a conduit for a cooling fluid, and is provided with connections for the entrance and exit of the cooling fluid.

The sealing of the sleeve 13 in the aforesaid annular groove is carried out by means of a packing 14a that it cooled by the aforesaid cooling conduit. The packing 14a is pressed downwardly by a pressure ring 15 that is forced down by screws 15a that connect the ring 15 with the annular flange 14. The pressure ring 15 is composed of an electrically non-conducting material, such as plastic, self-hardening resin, non-ferritic metal; when it is made of non-ferritic metal, the pressure ring 15 is provided with at least one radial slot to prevent the passage of electric current.

The sleeve 13 extends downwardly beyond the coil 17, and extends upwardly beyond the electric range of influence of the coil 17. The upper end of the sleeve 13 is vacuum sealed in a manner similar to that of the lower end of the sleeve 13.

The packing 14a is received in a hollow groove that is formed by an annular flange 14 that has an internal conduit for a coolant. The annular flange 14 of the upper part of the sleeve 13 is, however, connected to the steel mantle 16 that forms part of the housing of the furnace, and also, like the sleeve 13, forms part of the vacuum sealing means, and surrounds the upper part of the crucible 7 and surrounds the spout 7a.

The crucible 7 and the spout 7a are formed of rammed refractory material.

At the height of the alternating field that emanates from the coil 17, there are provided cooling means to cool the sleeve 13. These cooling means are provided inside the sleeve 13 and include a series of hair-pin shaped tubes 18. As best shown in FIG. 2, each tube 18 is bent back upon itself and is preferably composed of austenitic, heat resistant steel. The tubes 18 are embedded into the rammed mass of the crucible 7, and are disposed inwardly of an insulating layer 12 that is interposed between the tubes 18 and the sleeve 13. The tubes 18 are surrounded by a particularly fine ramming mass 19 composed of highly refractory material.

Each tube 18 is shaped like an inverted U and has both open ends 18a and 18b directed downwardly. Each tube 18 has a circular cross section at the entrance end 18a and the lower exit end 18b, while throughout the remainder of its length throughout which including its bend it is embedded in the mass, it has a flat cross section, narrow in the radial plane of the sleeve 13. This flat squeezed shape serves the purpose to increase the cooling surface of the tubes 18 for the sleeve 13.

Cross braces 18c are provided that interconnect the long sidewalls inside the tubes 18, and extend throughout the tube length, which serve to compensate for the reduced static strength in the aforesaid radial plane; these cross braces 18c preferably also are composed of austenitic, heat resistant steel.

In order to make the walls of the tubes 18 as thin as possible, sheets 20 are provided to take up pressures that are exerted by the molten metal radially outwardly, and between the sheets 20 and that side of the tubes 18 which faces the center of the crucible, there is provided an additional insulating layer 21. Each sheet 20 is preferably also made of austenitic steel, while the layer 21 is composed of material that has poor electric and heat conductivity characteristics.

As best shown in FIG. 1, the shorter entrance ends of the tubes 18a terminate in an annular channel 22 that forms a part of the bottom support structure for the crucible 7. The annular channel 22 is provided with an entrance pipe for connection to a blower for the cooling fluid (not shown).

The annular channel 22 is supported on the beams 4a of the tiltable frame 4, and serves on one hand to support the bottom plate 9, and on the other hand serves to be connected to the columns 4b. The longer leg of each tube 18 has its exit end 18b projecting axially through the annular channel 22 into the atmosphere, for the discharge of the cooling fluid.

The sleeve 13 is surrounded, along a portion of its height, by the coil 17. A series of twelve C-yokes 24 are arranged evenly spaced from each other circularly about the coil 17 to the exterior thereof. Each yoke 24 is composed of lamellae of transformer sheet metal.

As best shown in FIG. 1, a terminal 25 is provided for the electric current for interconnecting the coil 17 with the network; and a connection 26 is provided for interconnecting the coil 17 with a cooling liquid that courses, in a well-known manner, in the interior of the hollow coil 17. The conduits 14 for cooling the sealing devices heretofore described are also connected to the connection 26. The cooling conduits for the sealing devices hereafter described are also connected to the connection 26.

As best shown in FIG. 2, the space between the inner surface of the coil 17 and the outer surface of the sleeve 13 is filled with a layer 27 of liquid self-hardening resin, in order to take up the radially outwardly directed pressures of the ceramic material of the crucible 7, and to transfer it to the frame of the furnace.

An insulation 28 composed of mica, asbestos or fireproof felt is provided between the coil 17 and the yokes 24 that surround the coil 17.

As best shown in FIG. 2, the coil 17 is supported at its lower end by the inner leg of the yokes 24 and an insulating layer 29 thereon. To take up the electromechanical forces which occur in the windings of the coil 17 during the operation of the furnace, there are provided fingers 30a and a spring loaded anchor bolt 30. The fingers 30a press, by means of an insulating layer 29, against the upper portion of the coil 17. Each spring loaded anchor bolt 30 is connected to a yoke 24.

Reference is had to my Patent No. 2,852,587, dated September 16, 1958.

The crucible 7 is open on top and is covered, except for that part which leads into the spout 7a, by an inner cover 33. The cover 33 is vaulted and is composed of refractory bricks which are held together by a metal frame 33a. When the furnace is in operation, a stopper 34, which is also composed of refractory material, closes the open channel that leads to the spout 7a.

A bell-shaped outer lid 35 is provided that surmounts the crucible 7, the inner cover 33, as well as the spout 7a. The outer lid 35 is composed of steel sheet, and is lined on the interior with a fireproof insulation layer 35a.

The lower rim of the outer lid 35 has an inverted annular groove 36 which is filled with a deformable sealant 36a. On the exterior, the lid 35 has near the groove 36 an annular cooling conduit 37 which is provided with fittings 57a to be connected to the cooling connection 26.

The lid 35 rests with the sealant 36a on the apex of an annular wedge-shaped upright sealing ridge 38 that is formed on an annular carrying flange 39. The carrying flange 39 is hollow and has an internal conduit for a cooling fluid including a fitting 39a to be connected to the cooling connection 26. The carrying flange 39, by means of connecting struts 40, is welded to said steel mantle 16, and therefore is united therewith.

As best shown in FIGS. 3 and 4, a suction pipe line 41 is provided that leads from a vacuum pump (not shown) to a point under the lid 35 in the vacuum chamber of the furnace. The last portion of the suction line 41 is rotatable on a rotating joint 42 about the tilting axis X of the furnace, and terminates with an upward end piece 43 in the vacuum chamber of the furnace.

As best shown in FIG. 4, the carrying flange 39 is arranged eccentrically with respect to the upper outer contour of the crucible 7, and forms therewith a crescent 44. The end piece 43 of the suction line 41 terminates in the crescent 44. A sieve 45 is provided in the upwardly directed end piece 43 to guard the suction line 41 against the entry of solid particles falling into the end piece 43.

The inner cover 33 has a central aperture or opening 33b and the outer lid 35 has an opening 35b in register therewith. These openings 33b and 35b serve for the sampling of the molten metal mass or the adding of alloying material. Both openings may be closed. The opening 35b may gastightly be closed by a stopper 46 and, in connection with a superstructure 47, be sealed with a cap 48 which works according to the same principle as the lid 35 itself in connection with the sealing device that comprises the deformable sealant 36a, the ridge 38 and the cooling conduits 37 in the flange 39, as previously described. An objective 49 is provided that is sealed to the outer lid 35 and which permits viewing through the aperture 33b of the crucible 7 during operation of the furnace. The aperture 33b of the inner cover 33 may be closed by a flap 50 that is composed of refractory material and is manipulated from the exterior at 52 and is pivoted at 51.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a coreless induction furnace for large capacity charges, the combination of, a crucible, a primary induction coil adapted to be fed from an electric source surrounding said crucible, vacuum sealing means comprising a sleeve including gas impermeable material having low electric and magnetic conductivity characteristics disposed between said coil and said crucible and gastight upper and lower closure means operable for airtightly closing the upper end, respectively, the lower ends of said vacuum sealing means and defining a vacuum chamber housing said crucible, and cooling means for said sleeve disposed adjacent the inner surface of at least a portion of said sleeve, said upper closure means comprising at least one inner cover composed of refractory material and disposed within said vacuum chamber and surmounting said crucible to close the crucible, and at least one outer gas impermeable lid closing said vacuum chamber including said crucible gastightly.

2. Closure means, for use in connection with, a coreless induction furnace for large capacity charges, a primary induction coil adapted to be fed from an electric source surrounding said crucible, vacuum sealing means comprising a sleeve including gas impermeable material having low electric and magnetic conductivity characteristics disposed between said coil and said crucible, and cooling means for said sleeve disposed adjacent the inner surface of at least a portion of said sleeve, said closure means comprising gastight upper and lower closures firming part of said vacuum sealing means and adapted to close airtightly the upper and, respectively, the lower ends of said vacuum sealing means defining a vacuum chamber housing said crucible, said upper closures comprising at least one inner cover composed of refractory material and disposed within said vacuum chamber and adapted to surmount said crucible to close the crucible, and at least one outer gas impermeable lid closing said vacuum chamber including said crucible gastightly.

3. In a coreless induction furnace for large capacity charges, the combination with, a crucible, a primary induction coil adapted to be fed from an electric source surrounding said crucible, vacuum sealing means comprising a sleeve including gas impermeable material having low electric and magnetic conductivity characteristics disposed between said coil and said crucible, and cooling means for said sleeve disposed adjacent the inner surface of at least a portion of said sleeve, of gastight upper and lower closure means forming part of said vacuum sealing means and operable for airtightly closing the upper and, respectively, the lower ends of said vacuum sealing means and defining therewith a vacuum chamber housing said crucible, said upper closure means comprising at least one inner cover composed of refractory material and disposed within said vacuum chamber and surmounting said crucible to close the crucible, and at least one outer gas impermeable lid closing said vacuum chamber including said crucible gastightly.

4. In a coreless induction furnace, as claimed in claim 3, said crucible comprising a spout portion having a channel leading from the body of the crucible to the spout, said inner cover comprising a stopper removably disposed in said channel, whereby the top of the crucible will be closed, said outer lid surmounting said crucible and said spout and being eccentrically arranged relative to said crucible, and sealing means between said outer lid and said crucible comprising a carrying flange surrounding said crucible and supporting vacuum tightly said outer lid.

5. In a coreless induction furnace, as claimed in claim 4, said carrying flange comprising an upright ridge, said outer lid comprising a lower rim having an inverted groove, a deformable sealant disposed in said groove, and said outer lid resting with said sealant on said ridge, thereby being gastightly sealed.

6. In a coreless induction furnace, as claimed in claim 5, said carrying flange and said lower rim each comprising means establishing a conduit for cooling fluid.

7. In a coreless induction furnace, as claimed in claim 3, at least a part of the furnace being tiltable about an axis, said outer lid defining with the upper outer contour of the crucible a crescent-shaped space, a suction pipe line adapted to be connected to a source of vacuum and comprising an end portion rotatable about said tilting axis and terminating in an upward direction beneath said outer lid within said crescent-shaped space in said vacuum chamber.

8. In a coreless induction furnace, as claimed in claim 3, said inner cover having an aperture, said outer lid having an opening in registry with said aperture, means operable for gastightly closing said opening of said outer lid from the outside, and a flap manipulatable from the exterior of said outer lid for closing said aperture of said inner cover.

9. In a coreless induction furnace, as claimed in claim 8, an objective sealed in said outer lid and having its optical axis passing through said aperture.

10. In a coreless induction furnace, as claimed in claim 3, said outer lid being composed of metallic material and having an inner refractory heat insulation layer bonded to said metallic material.

References Cited by the Examiner
UNITED STATES PATENTS 3,056,847  10/1962  Junker _____ 13—27

RICHARD M. WOOD, *Primary Examiner.*

L. H. BENDER, *Assistant Examiner.*